(12) United States Patent
Zhang et al.

(10) Patent No.: US 11,901,539 B2
(45) Date of Patent: Feb. 13, 2024

(54) HEATING SHEET AND BATTERY MODULE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wancai Zhang, Fujian (CN); Junmin Feng, Fujian (CN); Tingting Wu, Fujian (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/967,310

(22) Filed: Oct. 17, 2022

(65) Prior Publication Data

US 2023/0045268 A1 Feb. 9, 2023

Related U.S. Application Data

(63) Continuation of application No. PCT/CN2021/080439, filed on Mar. 12, 2021.

(30) Foreign Application Priority Data

Jun. 7, 2020 (CN) .......................... 202021029335.3

(51) Int. Cl.
*H01M 10/6571* (2014.01)
*H01M 10/615* (2014.01)
*H05B 3/26* (2006.01)

(52) U.S. Cl.
CPC ..... *H01M 10/6571* (2015.04); *H01M 10/615* (2015.04); *H05B 3/26* (2013.01); *H05B 2203/007* (2013.01); *H05B 2203/016* (2013.01)

(58) Field of Classification Search
CPC ........... H01M 10/6571; H01M 10/615; H01M 10/647; H05B 3/26; H05B 2203/007; H05B 2203/016
See application file for complete search history.

(56) References Cited

U.S. PATENT DOCUMENTS 3,527,925 A * 9/1970 Takeo ...................... H05B 3/00
219/544
10,790,555 B2 * 9/2020 Lee ...................... H01M 10/486
(Continued)

FOREIGN PATENT DOCUMENTS

CN 201345397 Y 11/2009
CN 204118216 U 1/2015
(Continued)

OTHER PUBLICATIONS

CNIPA, International Search Report for International Patent Application No. PCT/CN2021/080439, Jun. 10, 2021, 6 pages.
(Continued)

*Primary Examiner* — Brittany L Raymond
(74) *Attorney, Agent, or Firm* — IP Spring

(57) ABSTRACT

A heating sheet and a battery module are provided. The battery module includes multiple battery cells and a heating sheet. The heating sheet includes multiple heating units and multiple connection units, and two adjacent heating units are coupled with each other through a connection unit. One heating unit may be attached to a side wall of one battery cell, and the connection unit corresponds to the gap region.

18 Claims, 3 Drawing Sheets

(56) References Cited

U.S. PATENT DOCUMENTS

| | | | |
|---|---|---|---|
| 2008/0226969 A1 | 9/2008 | Fattig | |
| 2012/0107665 A1* | 5/2012 | Abe | H01M 50/204 |
| | | | 219/548 |
| 2013/0236753 A1* | 9/2013 | Yue | B82Y 30/00 |
| | | | 165/185 |
| 2013/0307483 A1* | 11/2013 | Yoshida | H01M 10/6551 |
| | | | 429/120 |
| 2015/0171489 A1* | 6/2015 | Inaba | H01M 10/63 |
| | | | 429/61 |

FOREIGN PATENT DOCUMENTS

| | | | | | |
|---|---|---|---|---|---|
| CN | 105449313 | A | | 3/2016 | |
| CN | 106816672 | A | | 6/2017 | |
| CN | 108899613 | A | | 11/2018 | |
| CN | 110197937 | A | * | 9/2019 | ............ B60L 58/27 |
| CN | 110323385 | A | | 10/2019 | |
| CN | 110336098 | A | | 10/2019 | |
| CN | 210430029 | U | | 4/2020 | |
| CN | 212412133 | U | | 1/2021 | |

OTHER PUBLICATIONS

CNIPA, Written Opinion for International Patent Application No. PCT/CN2021/080439, Jun. 10, 2021, 11 pages.

EPO, Extended European Search Report for corresponding European Patent Application No. 21822051.5, dated Aug. 30, 2023, 8 pages.

* cited by examiner

HEATING SHEET AND BATTERY MODULE

CROSS-REFERENCE TO RELATED APPLICATIONS

This application is a continuation under 35 U.S.C. § 120 of International Application No. PCT/CN2021/080439, filed Mar. 12, 2021, which claims priority under 35 U.S.C. § 119(a) and/or PCT Article 8 to Chinese Patent Application No. 202021029335.3, filed Jun. 7, 2020. The entire disclosures of International Patent Application No. PCT/CN2021/080439 and Chinese Patent Application No. 202021029335.3 are incorporated herein by reference.

TECHNICAL FIELD

This disclosure relates to the field of batteries, and in particular to a heating sheet and a battery module.

BACKGROUND

In an environment with a relatively low temperature, a battery usually needs to be preheated, and a manner of preheating is usually electric heating by attaching a heating sheet to a side surface of the battery.

In the related art, if the heating sheet operates for a long time, the heating sheet may be burnt out or even cause fire.

SUMMARY

A battery module is provided in implementations of the present disclosure. The battery module may include multiple battery cells and a heating sheet. Two adjacent battery cells may be in contact with each other, and a gap region may be defined between side walls of the two adjacent battery cells. The heating sheet may include multiple heating units and multiple connection units, and two adjacent heating units are coupled with each other through a connection unit. A heating unit may be attached to a side wall of a battery cell, and the connection unit corresponds to the gap region. The heating unit may include an insulating film and a heating wire laid on the insulating film, and the heating wire has an inflow end and an outflow end. The connection unit may include a first connection film and a first conductive wire laid on the first connection film, and the outflow end of the heating unit may be electrically coupled with the inflow end of an adjacent heating unit through the first conductive wire. Two insulating films of the two adjacent heating units may be connected with each other through the first connection film. The first conductive wire may have a routing density less than the heating wire, or the first conductive wire may have a cross-sectional area larger than the heating wire, such that the connection unit has a heat productivity per unit area less than the heating unit.

BRIEF DESCRIPTION OF THE DRAWINGS

In order to explain technical solutions in implementations of the present disclosure more clearly, the following will give a brief introduction to accompanying drawings which are needed to be used in description of implementations. It should be understood that followings accompanying drawings only illustrate some implementations of the present disclosure and thus should not be considered as limitation to the scope. For those of ordinary skill in the art, other accompanying drawings can be obtained according to these accompanying drawings without creative efforts.

Figure 1:
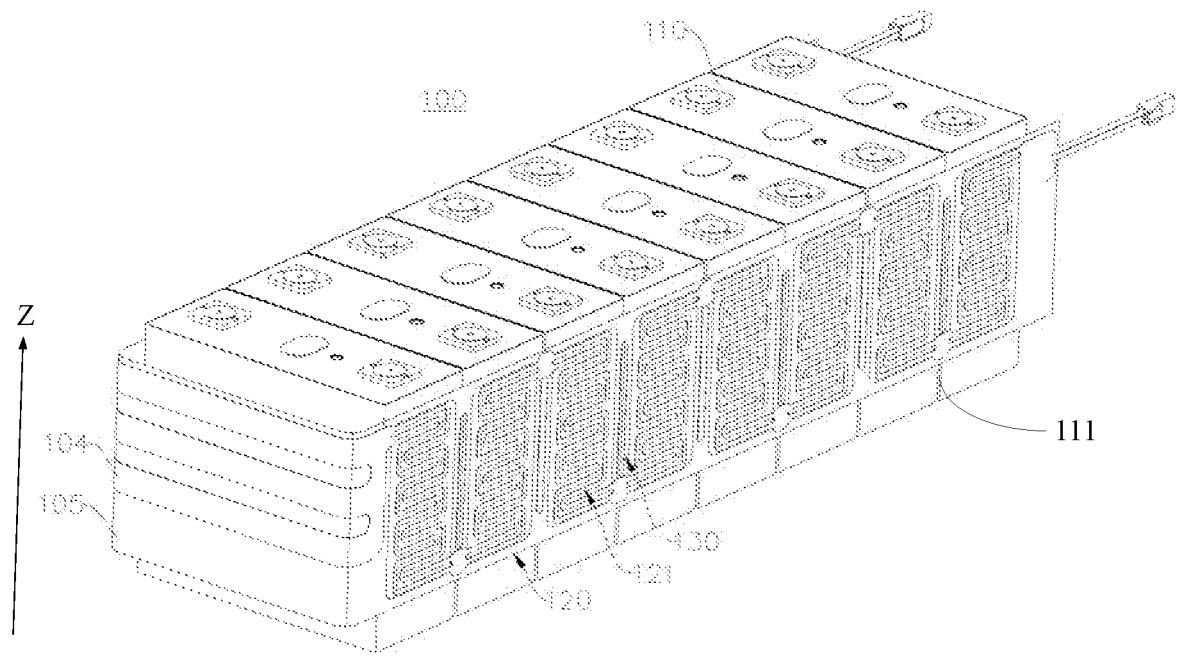
FIG. 1 is a schematic structural diagram of a battery module provided in implementations of the present disclosure.

REFERENCE SIGNS 100-battery module; 101-first conductive wire; 102-first connection film; 102a-film strip; 103-through hole; 104-second conductive wire; 105-second connection film; 110-battery cell; 111-gap region; 120-heating sheet; 121-heating unit; 122-insulating film; 123-heating wire; 1231-inflow end; 1232-outflow end; 130-connection unit; Z-direction.

DETAILED DESCRIPTION

In order to make a purpose, a technical solution, and an advantage of implementations of the present disclosure clearer, the technical solution of implementations of the present disclosure will be described clearly and completely in conjunction with accompanying drawings in implementations of the present disclosure. Obviously, described implementations are part of implementations of the present disclosure, not all of implementations. Generally, assemblies of implementations of the present disclosure, which are described and illustrated in the accompanying drawings herein, may be arranged and designed in a variety of different configurations.

Therefore, the detailed description of implementations of the present disclosure provided in the accompanying drawings is not intended to limit the claimed scope of the present disclosure, but illustrates only the selected implementations of the present disclosure. All the other implementations, obtained by those of ordinary skill in the art in light of implementations of the present disclosure without inventive efforts, will all fall within the claimed scope of the present disclosure.

It should be noted that similar signs and letters indicate similar items in the following accompanying drawings, and therefore, once an item is defined in an accompanying drawing, it is not necessary to further define and explain it in the subsequent accompanying drawings.

In the description of the implementations of the present disclosure, it should be understood that orientation or positional relations indicated by terms such as "center", "up", "down", "left", "right", "vertical", "horizontal", "inside", and "outside" are orientation or positional relations based on the accompanying drawings, or orientation or positional relations in which the application product is placed conventionally in use, or orientation or positional relations commonly understood by those of ordinary skill in the art, only for facilitating description of the present disclosure and simplifying the description, rather than indicating or implying that the referred devices or elements must be in a particular orientation or constructed or operated in the particular orientation, and therefore they should not be construed as limiting the present disclosure.

In addition, terms such as "first", "second", "third", etc., are used only for distinguishing illustration, and should not be construed as indicating or implying relativity importance.

In the description of the present disclosure, it also should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection, or an electrical coupling; and may be a direct connection, or an indirect connection via an intermediate medium, or may be an internal communication between two elements. The specific meanings of the above terms in the present disclosure could be understood by those of ordinary skill in the art according to specific situations.

Reference can be made to FIG. 1, which is a schematic structural diagram of a battery module 100 from a first viewing angle provided in implementations of the present disclosure. A battery module 100 is provided in implementations. The battery module 100 may include multiple battery cells 110 and a heating sheet 120. The multiple battery cells 110 may be arranged in sequence by being attached to each other, the heating sheet 120 may be attached to side walls (walls not attached to other battery cells 110) of battery cells 110, and a main function of the heating sheet 120 is to heat the battery cells 110. The multiple battery cells 110 are arranged in sequence by being attached to each other, and a battery cell 110 usually has chamfered structures at edges and corners. Therefore, after the battery cells 110 are attached to each other, a gap is defined between side walls of two adjacent battery cells 110, and a region corresponding to the gap is defined as a gap region 111 in implementations of the present disclosure.

Figure 2:
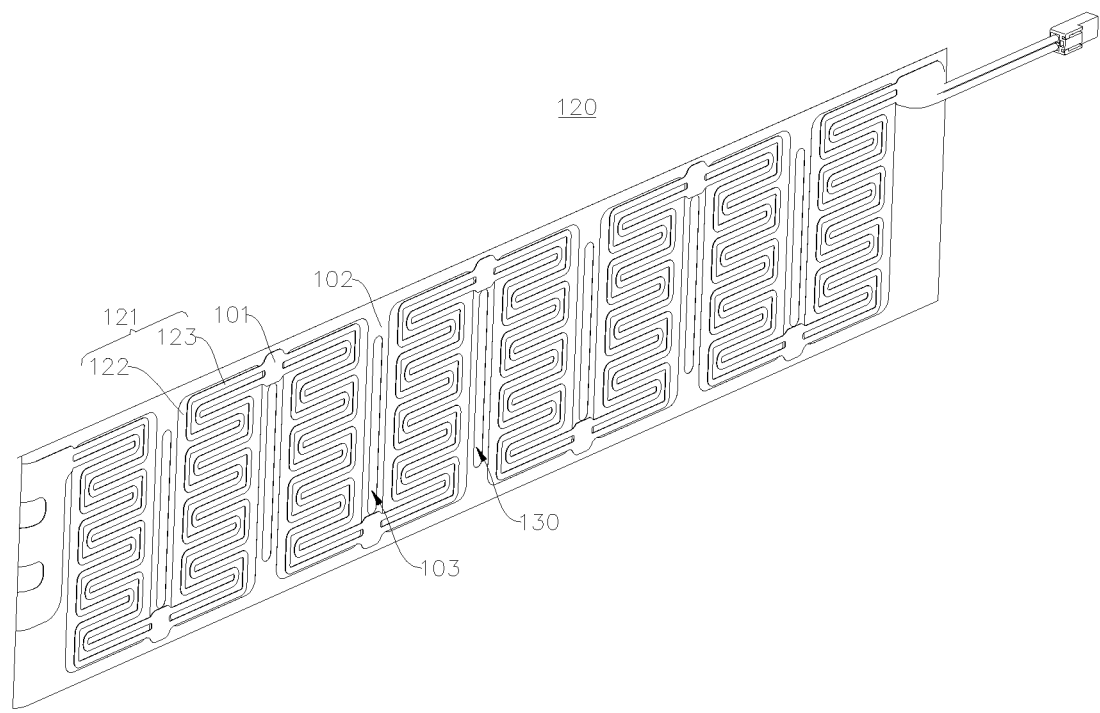
FIG. 2 is a schematic structural diagram of a heating sheet provided in implementations of the present disclosure.

Reference can be made to FIG. 2, which is a schematic structural diagram of a heating sheet 120 provided in implementations of the present disclosure. In implementations, the heating sheet 120 may include multiple heating units 121 and multiple connection units 130, and a connection unit 130 may have two opposite sides connected with two heating units 121 respectively.

One heating unit 121 may be attached to a side wall of one battery cell 110, and the connection unit 130 may correspond to the gap region 111.

Figure 3:
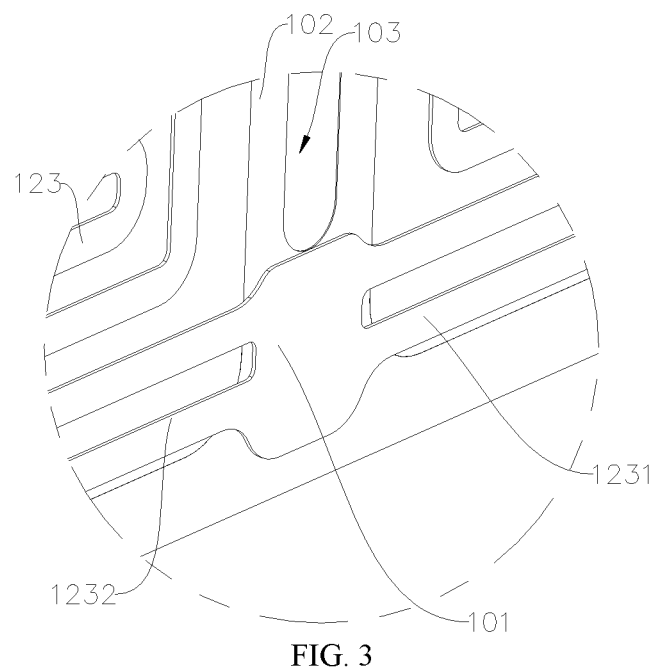
FIG. 3 is a schematic structural diagram of a first conductive wire provide in implementations of the present disclosure.

Reference can be made to FIG. 2 and FIG. 3 together, each heating unit 121 may include an insulating film 122 and a heating wire 123, and the heating wire 123 may be laid on the insulating film 122. The heating wire 123 may include an inflow end 1231 served as an inflow end 1231 of the heating unit 121 and an outflow end 1232 served as an outflow end 1232 of the heating unit 121, and a current flows into the heating wire 123 through the inflow end 1231 and then flows out through the outflow end 1232.

In implementations of the present disclosure, the heating sheet 120 may have two insulating films 122, and the heating wire 123 may be laid between the two insulating films 122. In order to show a trend of the heating wire 123 in the heating sheet 120, only one insulating film 122 at one side is illustrated in FIG. 1 to FIG. 6. In implementations of the present disclosure, shapes, sizes, and, materials of the insulating films 122 on the two surfaces may be the same. It should be noted that in other implementations, the insulating films 122 on the two surfaces may be different in at least one of shape, size, or material.

Each connection unit 130 may include a first conductive wire 101 and a first connection film 102. The first connection film 102 may be connected with insulating films 122 of adjacent heating units 121. Heating wires 123 of two adjacent heating units 121 may be coupled with each other through the first conductive wire 101, and an outflow end 1232 of the heating unit 121 may be electrically coupled with an inflow end 1231 of an adjacent heating unit 121 through the first conductive wire 101. The heating wire 123 may be located outside the side wall of the battery cell 110, heat emitted by the heating wire 123 is transferred to the side wall of the battery cell 110 to heat the battery cell 110, and the heating wire 123 may cover an entire surface of the side wall of the battery cell 110. The first conductive wire 101 may be located at a gap between the side walls of the two adjacent battery cells 110.

Each connection unit 130 may have two first connection films 102, and the first conductive wire 101 may be disposed between the two first connection films 120. In order to clearly represent arrangement of the first conductive wire 101, only one first connection film 102 is illustrated in FIG. 1 to FIG. 6. In addition, as illustrated in FIG. 1 to FIG. 4, and FIG. 6, the first connection film 102 may only cover part of the gap region 111.

The first conductive wire 101 may have a routing density less than the heating wire 123, or the first conductive wire 101 may have a cross-sectional area larger than the heating wire 123, such that the connection unit 130 has a heat productivity per unit area less than the heating unit 121. In other words, an arrangement interval of the first conductive wire 101 at the gap region 111 may be larger than an arrangement interval of the heating wire 123, and the heat productivity per unit area of the heating sheet 120 corresponding to the gap region 111 may be less than the heat productivity per unit area of the heating unit 121. Alternatively, the first conductive wire 101 may have the cross-sectional area larger than the heating wire 123, and the first conductive wire 101 may have resistance less than the heating wire 123, such that the heat productivity per unit area of the connection unit 130 is less than the heat productivity per unit area of the heating unit 121. Alternatively, the first conductive wire 101 may have a size (specifically, a routing size) larger than the heating wire 123 in an extension direction of the gap region 111.

In implementations, each of the first conductive wire 101 and the heating wire 123 may be made of copper. It should be noted that in other implementations of the present disclosure, the first conductive wire 101 and the heating wire 123 may be made of other materials. Accordingly, the first conductive wire 101 and the heating wire 123 may be made of different materials.

The battery cell 110 can have rounded-corner structures at edges and corners. The multiple battery cells 110 can be arranged by being attached to each other, and after the two adjacent battery cells 110 are attached to each other, rounded-corner structures of the battery cells 110 may be unable to be attached to insulating films 122. In other words, a corresponding gap region 111 between the two adjacent battery cells 110 is not easy to be attached to the heating sheet 120, a gap will exist between the heating sheet 120 and a position corresponding to a rounded-corner structure, resulting in no attachment.

Since the battery cells 110 are unable to be attached to the insulating film 122 at gap between the side walls of battery cells 110, if the heating sheet 120 is used for a long time, the heating sheet 120 corresponding to the gap region 111 will be locally overheated, resulting in damage. If the gap between the side walls of the battery cells 110 is filled with a thermally conductive adhesive, a weight of the battery module 100 will be increased, which is not beneficial to improving an energy density. In addition, an operation process of the thermally conductive adhesive is relatively complex, such that the heating sheet 120 is unable to be reworked.

In implementations, a heat productivity per unit area of the heating sheet 120 corresponding to the gap region 111 is less than a heat productivity per unit area of the heating unit 121. Since heat of the heating sheet 120 corresponding to the gap region 111 is reduced, and a heat productivity of part of the heating sheet 120 which is unable to be attached to the battery cells 110 is reduced, damage of the heating wire 123 caused by local overheating can be avoided.

FIG. 3 is a schematic structural diagram of a first conductive wire 101 provided in implementations of the present disclosure.

Reference can be made to FIG. 3, the outflow end 1232 of the heating unit 121 may be electrically coupled with the inflow end 1231 of an adjacent heating unit 121 through the first conductive wire 101. The first conductive wire 101 may only cover part of the first connection film 102.

The first conductive wire 101 only needs to electrically couple the outflow end 1232 of the heating unit 121 with the inflow end 1231 of the adjacent heating unit 121, and the first conductive wire 101 is disposed corresponding to part of the gap between the side walls of the two adjacent battery cells 110. The first conductive wire 101 itself will emit part of heat, but the first conductive wire 101 only covers part of the first connection film 102, the first conductive wire 101 has the routing density less than the heating wire 123, therefore heat emitted by the first conductive wire 101 is limited, such that the heat productivity per unit area of the heating sheet 120 corresponding to the gap region 111 is far less than the heat productivity per unit area of the heating unit 121, which can greatly alleviate a problem of local overheating.

Figure 4:
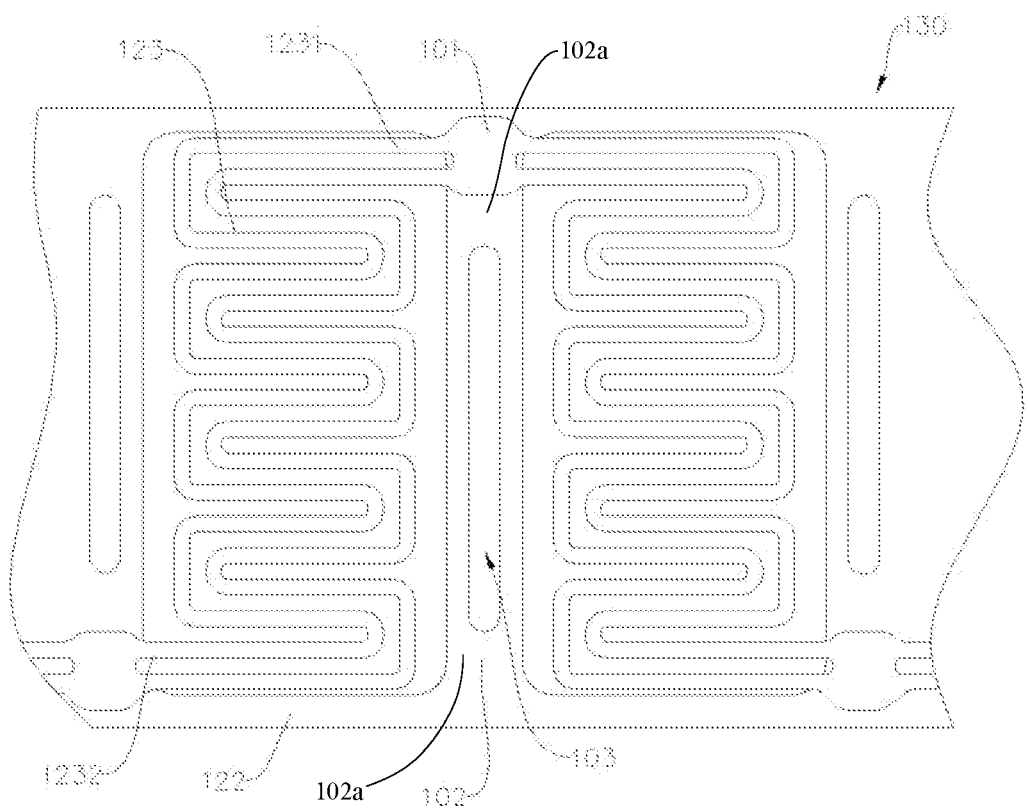
FIG. 4 is a partial schematic diagram of a heating sheet provide in an implementation of the present disclosure.

Reference can be made to FIG. 2 and FIG. 4, where FIG. 4 is a partial schematic diagram of a heating sheet 120 provided in an implementation of the present disclosure. In implementations, the insulating film 122 of the heating unit 121 may be connected with an insulating film 122 of the adjacent heating unit 121 through the first connection film 102, and the first conductive wire 101 may be laid on the first connection film 102. In other words, the first connection film 102 can be disposed at the gap between the side walls of the two adjacent battery cells 110, two opposite ends of the first connection film 102 are connected with insulating films 122 at two sides of the first connection film 102, and the first conductive wire 101 is laid on the first connection film 102.

A main function of the first connection film 102 is to connect the insulating films 122 at the two sides of the first connection film 102, to avoid short circuit and other phenomena caused by direct contract between the first conductive wire 101 and the battery cell 110. In addition, the main function of the first connection film 102 is further to carry and support the first conductive wire 101 to avoid the first conductive wire 101 from being broken off.

In implementations of the present disclosure, the first conductive wire 101 may only meet requirements of coupling the outflow end 1232 of the heating unit 121 with the inflow end 1231 of the adjacent heating unit 121, and the first conductive wire 101 is laid on the first connection film 102.

The first connection film 102 and the first conductive wire 101 can be implemented in various ways, for example, one implementation in FIG. 4. In one implementation, the first conductive wire 101 is only laid on part of the first connection film 102, and does not cover an entire first connection film 102. This arrangement is beneficial to reducing a heat productivity of the connection unit 130.

Reference can be made to FIG. 4 again. In implementations of FIG. 4, the first connection film 102 may define a through hole 103. The first connection film 102 may include two film strips 102a, the two film strips 102a are located at two ends of the insulating film 122 in a width direction of the insulating film 122 respectively, and each of the two film strips 102a has two ends connected with two insulating films 122 respectively. The two film strips 102a and the two insulating films 122 cooperatively define a long strip-shaped through hole 103. The through hole 103 may correspond to the gap region 111 between the two adjacent battery cells 110. It can be understood that in other implementations, the through hole 103 may be a circular hole or other irregularly-shaped holes. In other implementations of the present disclosure, the first connection film 103 may define at least one through hole 103, and the at least one through hole 102 may communicate with the gap region 111 between the side walls of the two adjacent battery cells 110. The at least one through hole 103 may be defined in part of the first connection film 103 where the heating wire 123 is not laid.

In implementations, the first connection film 102 may include the two film strips 102a, such that the two adjacent heating units 121 can be avoided from being folded or even torn. It can be understood that in other implementations, the first connection film 102 may include a greater number of film strips 102a.

The inflow end 1231 and the outflow end 1232 of the heating wire 123 may be located at the two ends of the insulating film 122 in the width direction of the insulating film 122 respectively, the two film strips 102a may also be located at the two ends of the insulating film 122 of the insulating film 122 in the width direction of the insulating film 122 respectively, and the first conductive wire 101 may be laid on the first connection film 102.

With aid of the through hole 103, "dry burning" of the first connection film 102 due to heat of the insulating films 122 at two sides being transferred to a position of a gap between the side walls of the battery cells 110 through the first connection film 102 can be avoided.

In implementations, the first connection film 102 and the insulating film 122 have the same materials and thicknesses, the first connection film 102 and the insulating film 122 are integrally molded, and the first connection film 102 and the insulating film 122 each are made of polyimide films. It should be noted that in other implementations of the present disclosure, the first connection film 102 and the insulating film 122 may be different in at least one of material or thicknesses, and the first connection film 102 and the insulating film 122 may be made of other materials.

Optionally, in implementations illustrated in FIG. 4, one heating wire 123 may have one inflow end 1231 and one outflow end 1232. Accordingly, two adjacent heating wires 123 may be coupled with each other through only one first conductive wire 101, and the first conductive wire 101 may be laid on one film strip 102a. Optionally, in implementations, in order to reduce a length of the first conductive wire 101, an extension direction of the first conductive wire 101 may be an arrangement direction of the multiple battery cells 110. With this disposing manner, a routing length and a routing area of the first conductive wire 101 corresponding to the gap between the side walls of the two adjacent battery cells 110 can be reduced, and heat emitted by the first conductive wire 101 can be reduced. In implementations, one inflow end 1231 may include two parallel lines. Accordingly, the outflow end 1232 may include two parallel lines, and the first conductive wire 101 may also include two parallel lines. It should be noted that in implementations of the present disclosure, the number of lines included in the output end 1232 is not limited.

Reference can be made to FIG. 4 again. In implementations of FIG. 4, the cross-sectional area of the first conductive wire 101 may be larger than the cross-sectional area of the heating wire 123. The cross-sectional area of the first conductive wire 101 is larger than the cross-sectional area of the heating wire 123, which is beneficial to reducing resistance of the first conductive wire 101 and further reducing a heat productivity of the first conductive wire 101 when a current passes through the first conductive wire 101.

Optionally, in implementations illustrated in FIG. 4, the first conductive wire 101 may have a width larger than the heating wire 101 in a direction parallel to the side wall of the battery cell 110. In other words, the first conductive wire 101 and the heating wire 123 may have the same thicknesses (a size in a direction perpendicular to the side wall of the battery cell 110), such that a purpose that the cross-sectional area of the first conductive wire 101 is larger than the cross-sectional area of the heating wire 123 can be realized only by increasing the width of the width of the first conductive wire 101. With this disposing manner, under a condition that resistance of the first conductive wire 101 is reduced, a size of the heating sheet 120 in the direction perpendicular to the side wall of the battery cell 110 can be avoided from being increased, such that indentation, puncture, etc., in a subsequent packaging process can be avoided.

It should be noted that in other implementations of the present disclosure, the first conductive wire 101 may have the width the same as or slightly smaller than the heating wire 123.

Figure 5:
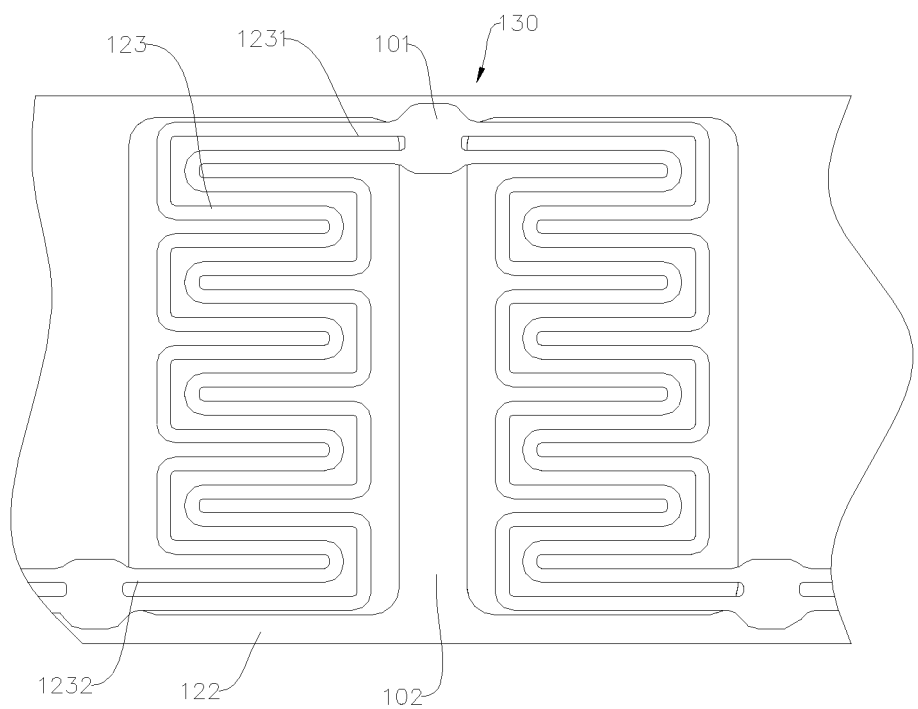
FIG. 5 is a partial schematic diagram of a heating sheet provide in another implementation of the present disclosure.

FIG. 5 is a partial schematic diagram of a heating sheet provided in another implementation of the present disclosure.

Reference can be made to FIG. 3 to FIG. 5 together, in implementations illustrated in FIG. 5, the first connection film 102 defines no through hole 103. In other words, two opposite sides of the first connection film 102 may be connected with insulating films 122 of heating units 121 respectively, and the first connection film 102 can cover the gap between the two adjacent battery cells 110.

In implementations illustrated in FIG. 5, each of the inflow end 1231 and the outflow end 1232 of the heating wire 123 is located in the middle of the insulating film 122 in a width direction of the insulating film 122. Accordingly, two opposite ends of the first conductive wire 101 may be electrically coupled with the outflow end 1232 of a heating unit 121 and an inflow end 1231 of an adjacent heating unit 121 respectively. The inflow end 1231 may include two lines. Accordingly, the outflow end 1232 may include only one line. The cross-sectional area of the first conductive wire 101 may be larger than the cross-sectional area of the heating wire 123.

It should be noted that the width direction of the insulating film 122 refers to a direction parallel to a height direction of the battery cell 110, in other words, as illustrated in FIG. 1, the width direction of the insulating film 122 is direction Z. The middle of the insulating film 122 in the width direction of the insulating film 122 refers to a position which is not located at two ends of the insulating film 122, where the middle here is not limited to a middle in size.

In implementations illustrated in FIG. 5, the first conductive wire 101 may only partially cover the first connection film 102, which can also greatly reduce the heat productivity of the heating sheet 120 corresponding to the gap region 111 to avoid dry burning of the heating sheet 120 corresponding to the gap region 111, thereby avoiding damage to the heating sheet 120.

It can be understood that in implementations, the first connection film 102 may also define a through hole 103. The through hole 103 may be defined in part of the first connection film 102 where the heating wire 123 is not laid. For example, a hole, such as a U-shaped hole, etc., may be defined above or below the heating wire 123. The connection film 102 defines the U-shaped hole, such that damage of the heating sheet 120 due to excessive temperature at this position caused by local overheating of the connection unit 130 can be avoided.

Figure 6:
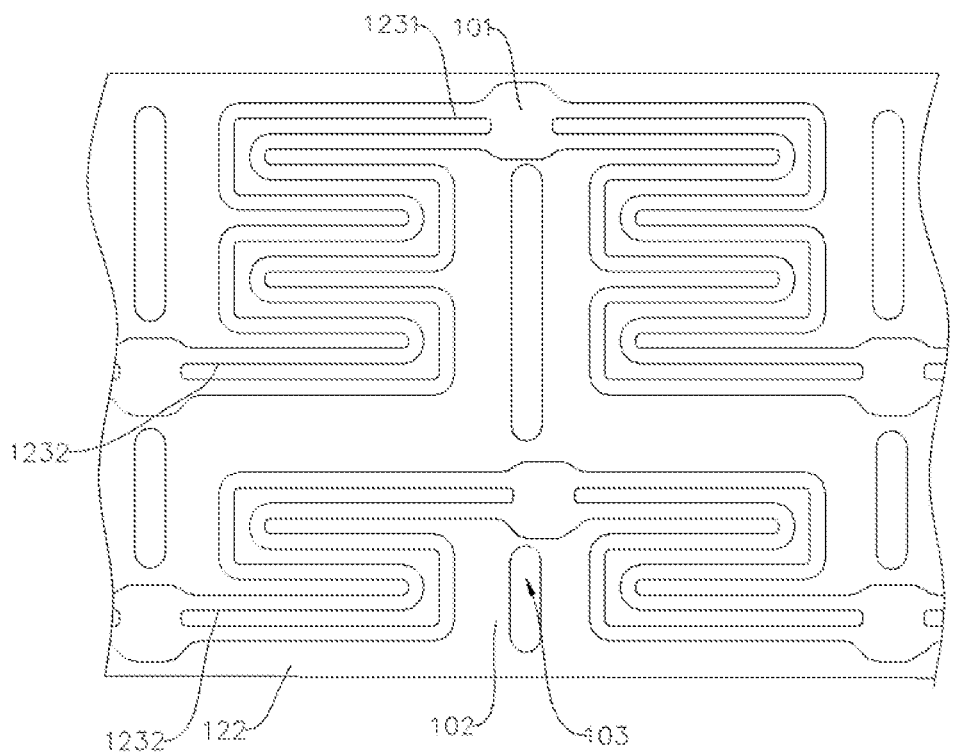
FIG. 6 is a partial schematic diagram of a heating sheet provide in yet another implementation of the present disclosure.

FIG. 6 is a partial schematic diagram of a heating sheet 120 provided in yet another implementation of the present disclosure.

Reference can be made to FIG. 6. In implementations illustrated in FIG. 6, the heating wire 123 disposed on the insulating film 122 may have two inflow ends 1231 and two outflow ends 1232. The two inflow ends 1231 on the same insulating film 122 may be disposed independently, and the two outflow ends 1232 on the same insulating film 122 may be disposed independently. Accordingly, one connection unit 130 may be configured with two first conductive wires 101. Two opposite ends of the first conductive wire 101 may be electrically coupled with an outflow end 1232 of a heating unit 121 and an inflow end 1231 of an adjacent heating unit 121 respectively.

The first conductive film 102 may include two film strips 102a. One first conductive wire 101 may be laid on one film strip 102a, and the through hole 103 may be defined between two adjacent film strips 102a. It can be understood that the first connection film 102 may define no through hole 103. In other words, no gap may exist between the above two film strips.

Optionally, in implementations, the cross-sectional area of the first conductive wire 101 may be larger than the cross-section area of the heating wire 123.

It should be noted that in other implementations, the heating wire 123 disposed on the insulating film 122 may have three, four, or more independent inflow ends 1231. Heating wires 123 of two adjacent heating units 121 may be coupled with each other through the same number of first conductive wires 101 as inflow ends 1231.

In implementations illustrated in FIG. 6, the first conductive wires 101 of the connection unit 130 may only cover part of the first connection film 102, which can also greatly reduce a heat productivity of the connection unit 130 to avoid dry burning of the connection unit 130, thereby avoiding damage to the heating sheet 120 due to the dry burning.

Alternatively, in other implementations of the present disclosure, the heating wire 123 disposed on the insulating film 122 may have one inflow end 1231 and one outflow end 1232. An outflow end 1232 of one heating unit 121 may be located at an upper end of the insulating film 122, and an inflow end 1231 of an adjacent heating unit 121 may be located at a lower end of the insulating film 122. Two opposite ends of the first conductive wire 101 may be electrically coupled with the outflow end 1232 of the heating 121 and the inflow end 1231 of the adjacent heating unit 121 respectively.

In other words, the outflow end 1232 and the inflow end 1231 which are coupled with each other through the first conductive wire 101 are not located at the same side of the heating sheet 120, but located at two opposite sides of the heating sheet 120. The gap between the two adjacent battery cells 110 may be in a shape of a rectangle, and the first conductive wire 101 may be located at a diagonal of the rectangle.

In implementations, a shape of the first connection film 120 may correspond to a shape of the first conductive wire 101. It can be understood that in other implementations of the present disclosure, the first connection film 102 may cover an entire gap between two battery cells 110.

In implementations illustrated in FIG. 6, the first conductive wires 101 only partially covers the gap between the side walls of the two adjacent battery cells 110, which can greatly reduce the heat productivity of the connection unit 130 and avoid damage to the heating sheet 120 caused by the connection unit 130.

It should be noted that in implementations of the present disclosure, the first conductive wire 101 and the first connection film 102 may also be disposed in other ways, which are not limited to implementations illustrated in FIG. 3 to FIG. 6. For example, in implementations illustrated in FIG. 4 to FIG. 6, the first conductive wire 101 may have a substantially straight line, but in other implementations, the first conductive wire 101 may have a curved path, etc.

In implementations of FIG. 4 to FIG. 6, heating wires 123 of two adjacent heating units 121 may be laid in the same way. Multiple heating wires 123 may be sequentially coupled through first conductive wires 101 to form an S-shaped path. It can be understood that in other implementations of the present disclosure, the heating wires 123 on the two adjacent heating units 121 may be laid in different ways, as long as the heating wires 123 of the two adjacent heating units 121 are electrically coupled with each other through the first conductive wire 101.

Optionally, in implementations of FIG. 4 to FIG. 6, the first conductive wire 101 of the connection unit 130 may only cover part of the first connection film 102. It can be understood that in other implementations of the present disclosure, the first conductive wire 101 of the connection unit 130 may be laid on an entire first connection film 102 to increase the cross-sectional area of the first conductive wire 101, such that the cross-sectional area of the first conductive wire 101 is larger than the cross-sectional area of the heating wire 123. Specifically, a routing cross-sectional area of the first conductive wire 101 is larger than a routing cross-sectional area of the heating wire 123. Therefore, a purpose that the heat productivity per unit area of the connection unit 130 is less than the heat productivity per unit area of the heating unit 121 is realized.

It should be noted that an arrangement manner and a laid manner of the heating wire 123 are not limited in the present disclosure. For example, the heating wire 123 may be laid in multiple directions, such as a transverse direction, a longitudinal direction, an included direction, etc.

It should be noted that for implementations where the first connection film 120 includes multiple film strips 102a, the number of film strips may correspond to the number of first conductive wires 101, and the number of film strips 102a may also be greater than the number of first conductive wires 101. Accordingly, a shape of a film strip 102a may or may not be adapted to a shape laid by the first conductive wire 101, as long as the first conductive wire 101 is attached to the film strip 102a.

Reference can be made to FIG. 1 again, in implementations, the battery module 100 may include two heating sheets 120, and the two heating sheets 120 may be coupled with each other through a second conductive wire 104. In detail, the two heating sheets 120 may be attached to two opposite side walls of the battery cell 110 respectively, and heating wires 123 of the two heating sheets 120 may be coupled with each other through the second conductive wire 104.

The two heating sheets 120 each have an end, where a heating wire 123 of a heating unit 121 at the end of one heating sheet 120 may be coupled with a heating wire 123 of a heating unit 121 at the end of another heating sheet 120 through the second conductive wire 104. In detail, an outflow end 1232 of one heating wire 123 may be electrically coupled with an inflow end 1231 of another heating wire 123 through the second conductive wire 104.

The two heating sheets 120 may be coupled with each other through the second conductive wire 104 instead of a connector, such that a problem of coupling failure caused by damage at connection positions of the two heating sheets 120 and the connector can be avoided. In addition, a welding process between the connector and the heating wire 123 is replaced by adapting the second conductive wire 104, such that welding costs, wiring-harness material costs, connector costs, wiring-harness fixing costs, etc., can be avoided, and manufacturing costs of the heating sheet 120 can be reduced.

It should be noted that in some implementations of the present disclosure, the two heating sheets 120 may also be electrically coupled with each other through the connector, etc.

Optionally, in implementations of the present disclosure, the cross-sectional area of the second conductive wire 104 may be larger than the cross-sectional area of the heating wire 123. For example, in a height direction (i.e., direction Z in FIG. 1) of the battery cell 110, a width of the second conductive wire 104 may be larger than a width of the heating wire 123. The cross-sectional area of the second conductive wire 104 is relatively large, such that resistance of the second conductive wire 104 can be reduced, and the heat productivity emitted by the second conductive wire 104 can be reduced.

Optionally, in implementations of the present disclosure, insulating films 122 of the two heating sheets 120 may be connected with each other through a second connection film 105, and the second conductive wire 104 may be laid on the second connection film 105.

In other words, two opposite ends of the second connection film 105 may be coupled with insulating films 122 at ends of the two heating sheets 120 respectively. A main function of the second connection film 105 is to carry the second conductive wire 104. In addition, the second connection film 105 can also transfer heat of the second conductive wire 104 to the insulating films 122 at the ends of the two heating sheets 120, to heat side walls of battery cells 110 and increase a heat utilization rate.

In implementations, the second connection film 105 may be integrated with insulating films 122 of the two heating sheets 120, and the second connection film 105 and the insulating films 122 of the two heating sheets 120 may be made of the same materials. It should be noted that in other implementations of the present disclosure, the second connection film 105 may be connected with the insulating films 122 of the two heating sheets 120 in other ways, and the second connection film 105 and the insulating films 122 of the two heating sheets 120 may be made of different materials.

Advantages of the battery module 100 provided in implementations of the present disclosure include, for example, the following.

The outflow end 1232 of the heating unit 121 may be electrically coupled with the inflow end 1231 of the adjacent heating unit 121 through the first conductive wire 101, such that the heating wires 123 of the two adjacent heating units 121 are electrically coupled with each other. The connection unit 130 has the heat productivity per unit area less than the heating unit 121, such that heat emission of the connection unit 130 can be reduced, and "drying burning" caused by the heat of the connection unit 130 being unable to be transferred to the battery cell 110 in the direct contact manner is effectively avoided, thereby avoiding the situation of damage of the heating sheet due to local overheating.

For implementations where the first conductive wire 101 covers the part of the first connection film 102, the heat productivity of the connection unit 130 can be greatly reduced, and the situation of damage to the heating sheet 120 caused by local overheating is avoided. For implementations where the first connection film 102 defines the through hole 103, the through hole 103 can solve the problem that the heating sheet 120 is damaged due to local overheating caused by a poor thermal conductive property of the heating sheet 120 as a result of the heating sheet 120 at the gap position being unable to be attached to the battery cell 110.

For implementations where the first conductive wire 101 has the relatively large cross-sectional area, the first conductive wire 101 has the relatively small resistance, and the first conductive wire 101 generates the relatively low heat productivity, which can also avoid the problem that the heating sheet 120 is damaged due to local overheating caused by excessive heat emitted by the first conductive wire 101.

The heating sheet 120 is further provided in implementations of the present disclosure. For the structure and size of the heating sheet 120, reference can be made to the heating sheet 120 in the battery module 100 of the above implementations.

The heating sheet 120 provided in implementations of the present disclosure, can greatly solve the problem that the heating sheet 120 is damaged due to local overheating caused by "dry heating".

The above descriptions are only preferred implementations of the present disclosure, and are not used to limit the present disclosure. For those of ordinary skill in the art, the present disclosure may have various changes and variations. Any modification, equivalent replacement, improvement, etc., made within the spirit and principles of the present disclosure shall be included in the scope of protection of the present disclosure.

A heating sheet and a battery module are provided in the present disclosure. The battery module includes multiple battery cells and a heating sheet. The heating sheet includes multiple heating units and multiple connection units, and two heating units are coupled with each other through a connection unit. One heating unit is attached to a side wall of one battery cell, and the connection unit corresponds to a gap region. The connection unit has a heat productivity per unit area less than the heating unit, such that heat of the heating sheet corresponding to the gap region is reduced, and "dry burning" caused by the heat of the heating sheet corresponding to the gap region being unable to be transferred to the battery cell in a direct contact manner is effectively avoided, thereby avoiding a situation that the heating sheet is damaged due to local overheating.

In addition, it can be understood that the heating sheet and the battery module of the present disclosure can be reproduced and can be used in a variety of industrial applications. For example, the heating sheet and battery module of the present disclosure can be applicable to any component with the battery module supplying power.

What is claimed is:

1. A battery module, comprising:
a plurality of battery cells; and
a heating sheet, wherein,
two adjacent battery cells are in contact with each other, and a gap region is defined between side walls of the two adjacent battery cells;
the heating sheet comprises a plurality of heating units and a plurality of connection units, two adjacent heating units are coupled with each other through a connection unit, a heating unit is attached to a side wall of a battery cell, and the connection unit corresponds to the gap region;
the heating unit comprises an insulating film and a heating wire laid on the insulating film, and the heating wire has an inflow end and an outflow end;
the connection unit comprises a first connection film and a first conductive wire laid on the first connection film, the outflow end of the heating unit is electrically coupled with the inflow end of an adjacent heating unit through the first conductive wire, and two insulating films of the two adjacent heating units are connected with each other through the first connection film;
the insulating film and the first connection film are located on the same plane parallel to the side wall of the battery cell, and the heating wire and the first conductive wire are located on the same plane parallel to the side wall of the battery cell;
the first conductive wire has a routing density less than the heating wire, or the first conductive wire has a cross-sectional area larger than the heating wire, such that the connection unit has a heat productivity per unit area less than the heating unit; and
the first conductive wire has a size larger than the heating wire in an extension direction of the gap region, and/or the first conductive wire has a width larger than the heating wire in a direction parallel to the side wall of the battery cell.

2. The battery module of claim 1, wherein each of the plurality of connection units is provided with first connection films at two surfaces respectively.

3. The battery module of claim 2, wherein the first conductive wire is only laid on part of the first connection film.

4. The battery module of claim 2, wherein the first connection film only covers part of the gap region.

5. The battery module of claim 2, wherein the first connection film defines at least one through hole, and the at least one through hole communicates with the gap region between the side walls of the two adjacent battery cells.

6. The battery module of claim 1, wherein the first conductive wire is only laid on part of the first connection film.

7. The battery module of claim 6, wherein the first connection film only covers part of the gap region.

8. The battery module of claim 6, wherein the first connection film defines at least one through hole, and the at least one through hole communicates with the gap region between the side walls of the two adjacent battery cells.

9. The battery module of claim 1, wherein the first connection film only covers part of the gap region.

10. The battery module of claim 1, wherein the first connection film defines at least one through hole, and the at least one through hole communicates with the gap region between the side walls of the two adjacent battery cells.

11. The battery module of claim 10, wherein the first connection film comprises two film strips, the two film strips are located at two ends of the insulating film in a width direction of the insulating film respectively, each of the two film strips has two ends connected with two insulating films respectively, and the two film strips and the two insulating films cooperatively define the through hole.

12. The battery module of claim 11, wherein the through hole is defined in part of the first connection film where the heating wire is not laid.

13. The battery module of claim 10, wherein the through hole is defined in part of the first connection film where the heating wire is not laid.

14. The battery module of claim 1, wherein an extension direction of the first conductive wire is an arrangement direction of the plurality of battery cells.

15. The battery module of claim 1, wherein each of the inflow end and the outflow end of the heating wire is located in the middle of the insulating film in a width direction of the insulating film.

16. The battery module of claim 1, wherein the heating sheet is implemented as two heating sheets; and
   the two heating sheets are attached to two opposite side walls of the battery cell respectively, and the heating wires of the two heating sheets are coupled with each other through a second conductive wire.

17. The battery module of claim 16, wherein the insulating films of the two heating sheets are connected with each other through a second connection film, and the second conductive wire is laid on the second connection film.

18. The battery module of claim 16, wherein the second conductive wire has a cross-sectional area larger than the heating wire.

* * * * *